United States Patent [19]

Malherbe

[11] Patent Number: 5,686,858
[45] Date of Patent: Nov. 11, 1997

[54] TEMPERATURE DETECTOR ON AN INTEGRATED CIRCUIT

[75] Inventor: Alexandre Malherbe, Trets, France

[73] Assignee: SGS-Thomson Microelectronics S.A., Saint Genis, France

[21] Appl. No.: 521,019

[22] Filed: Aug. 30, 1995

[30] Foreign Application Priority Data

Aug. 31, 1994 [FR] France ................... 94 10499

[51] Int. Cl.$^6$ ........................................ H01L 35/00
[52] U.S. Cl. ..................... 327/512; 327/378; 323/315
[58] Field of Search ............................ 327/512, 513, 327/546, 378, 539; 323/313, 315

[56] References Cited

U.S. PATENT DOCUMENTS

| | | | |
|---|---|---|---|
| 4,645,948 | 2/1987 | Morris et al. | 327/513 |
| 4,659,944 | 4/1987 | Miller, Sr. et al. | 327/546 |
| 5,039,878 | 8/1991 | Armstrong et al. | 327/512 |
| 5,159,520 | 10/1992 | Toyooka et al. | 327/512 |
| 5,304,861 | 4/1994 | Fruhauf et al. | 307/296.4 |
| 5,434,534 | 7/1995 | Lucas | 327/545 |
| 5,477,176 | 12/1995 | Chang et al. | 327/513 |
| 5,563,760 | 10/1996 | Lowis et al. | 361/103 |

FOREIGN PATENT DOCUMENTS

| | | |
|---|---|---|
| 0 369 530 | 5/1990 | European Pat. Off. . |
| 2 627 027 | 8/1989 | France . |

*Primary Examiner*—Timothy P. Callahan
*Assistant Examiner*—Jung Ho Kim
*Attorney, Agent, or Firm*—Wolf, Greenfield & Sacks, P.C.; James H. Morris

[57] ABSTRACT

An integrated circuit including a temperature threshold detector. This detector includes two MOS transistors with a same type of conductivity, circuitry for applying to the second transistor a gate-source voltage higher than the gate-source voltage of the first transistor by a value Vbe, VbE being the drop in voltage at the terminals of a forward-biased PN junction, and a comparator for comparing the currents flowing in the two transistors. The current in the second transistor diminishes faster than the current in the first transistor. If the dimensions of the transistors are accurately chosen, the curves pertaining to the diminishing of current (or curves deduced from these curves by homothetic transformation) intersect one another for a certain temperature. The detection of equality of the currents therefore enables a detection of the passage through this temperature.

12 Claims, 4 Drawing Sheets

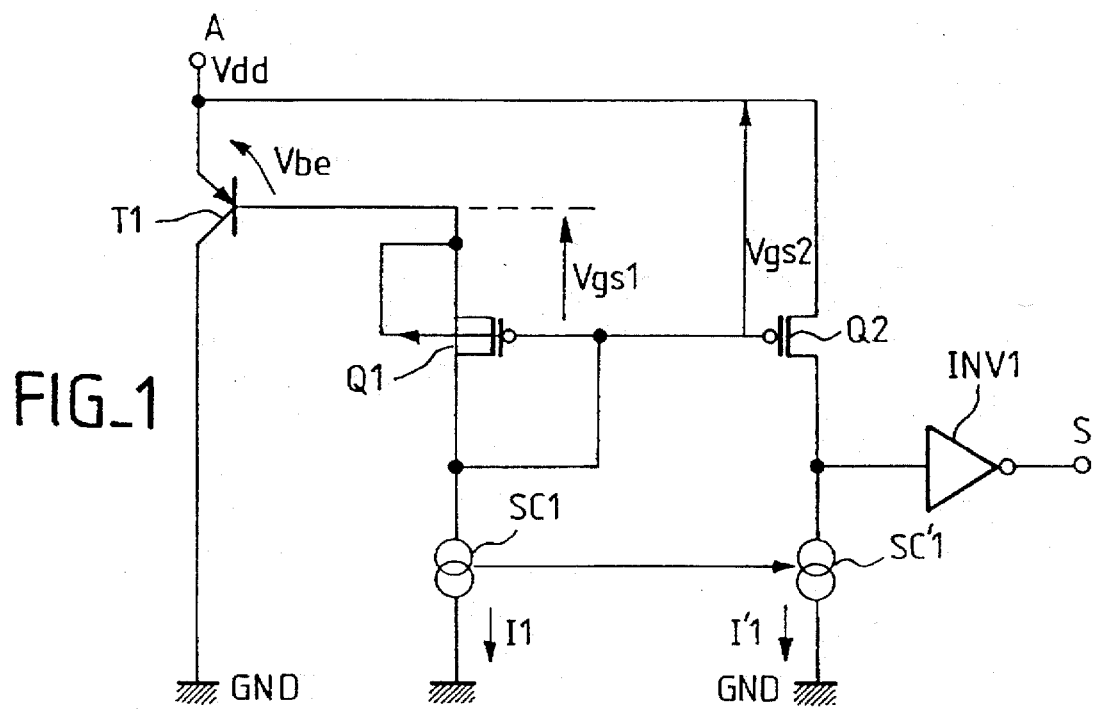
FIG_1
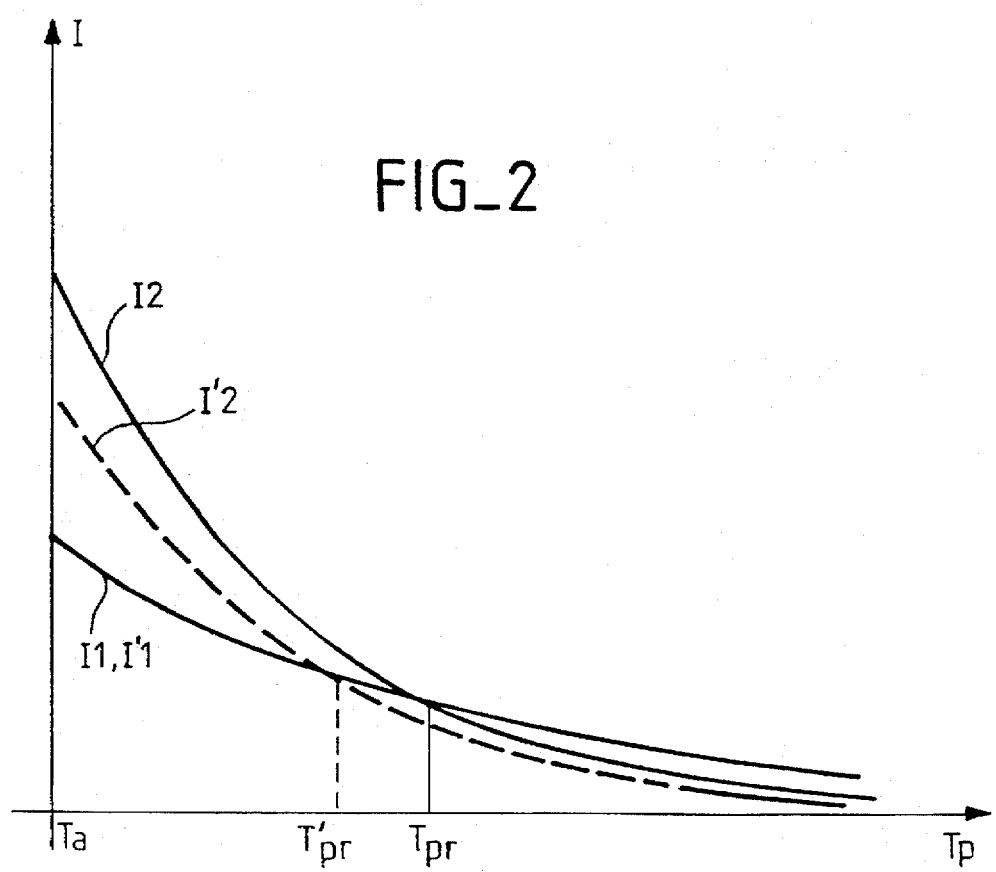
FIG_2

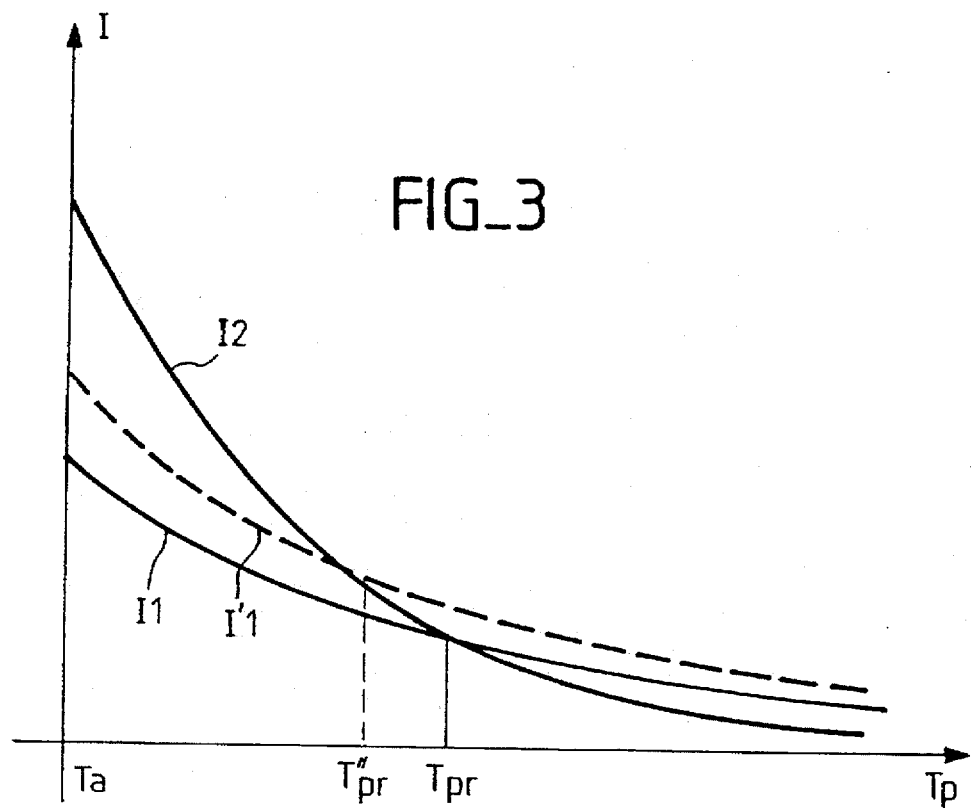
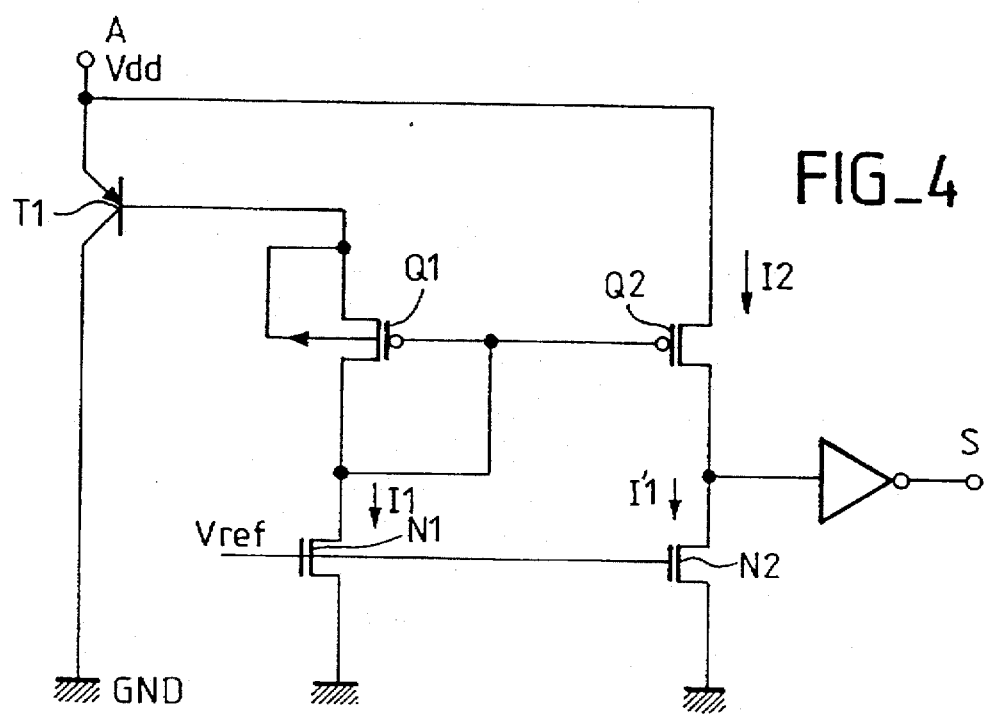

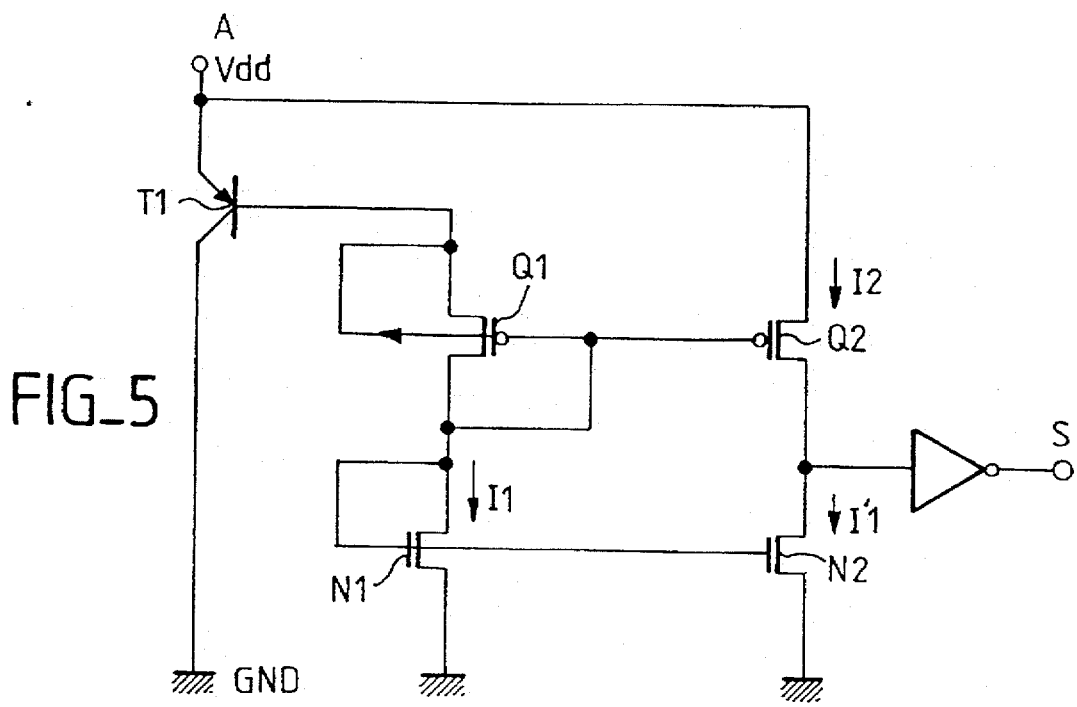
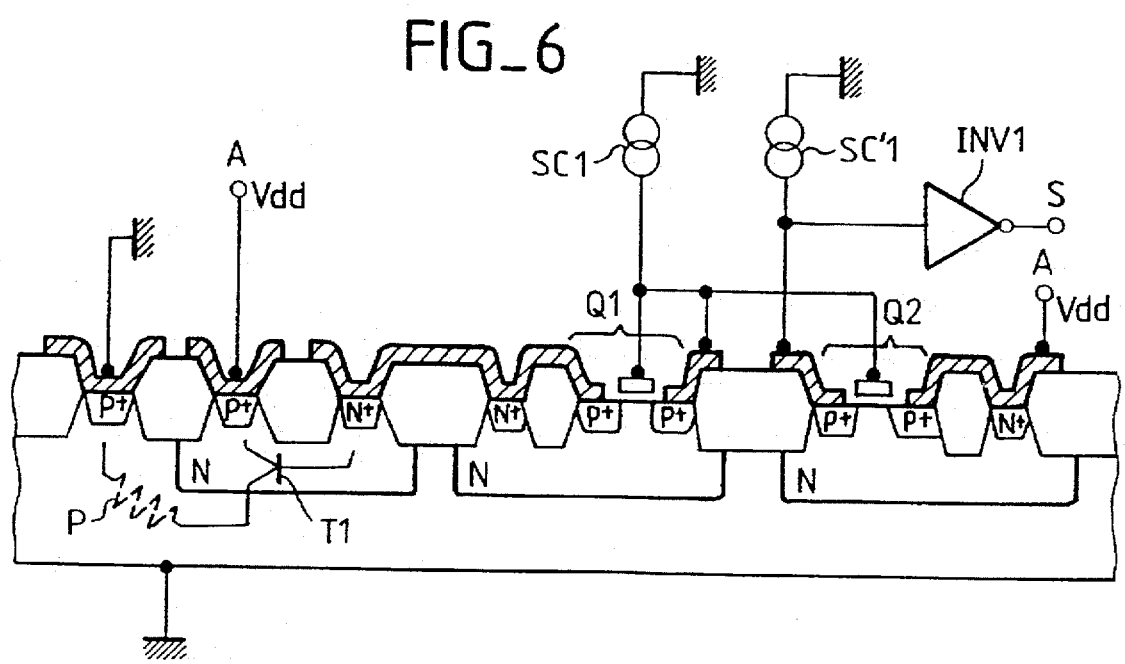

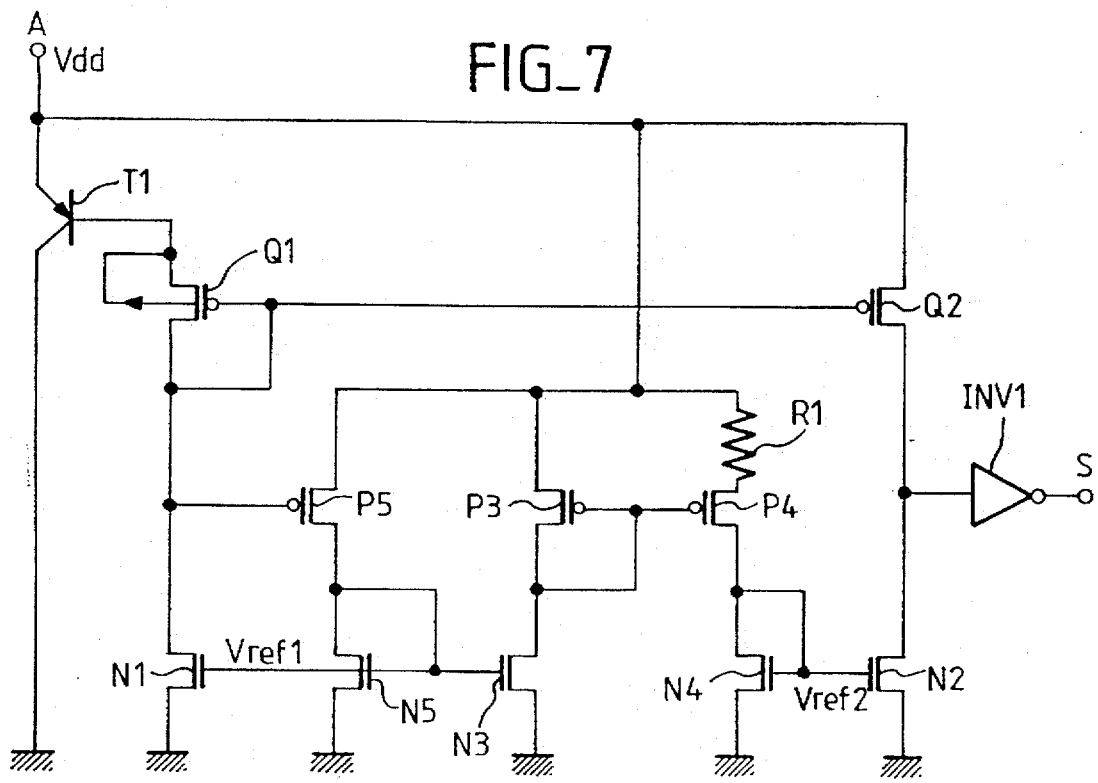
FIG_7
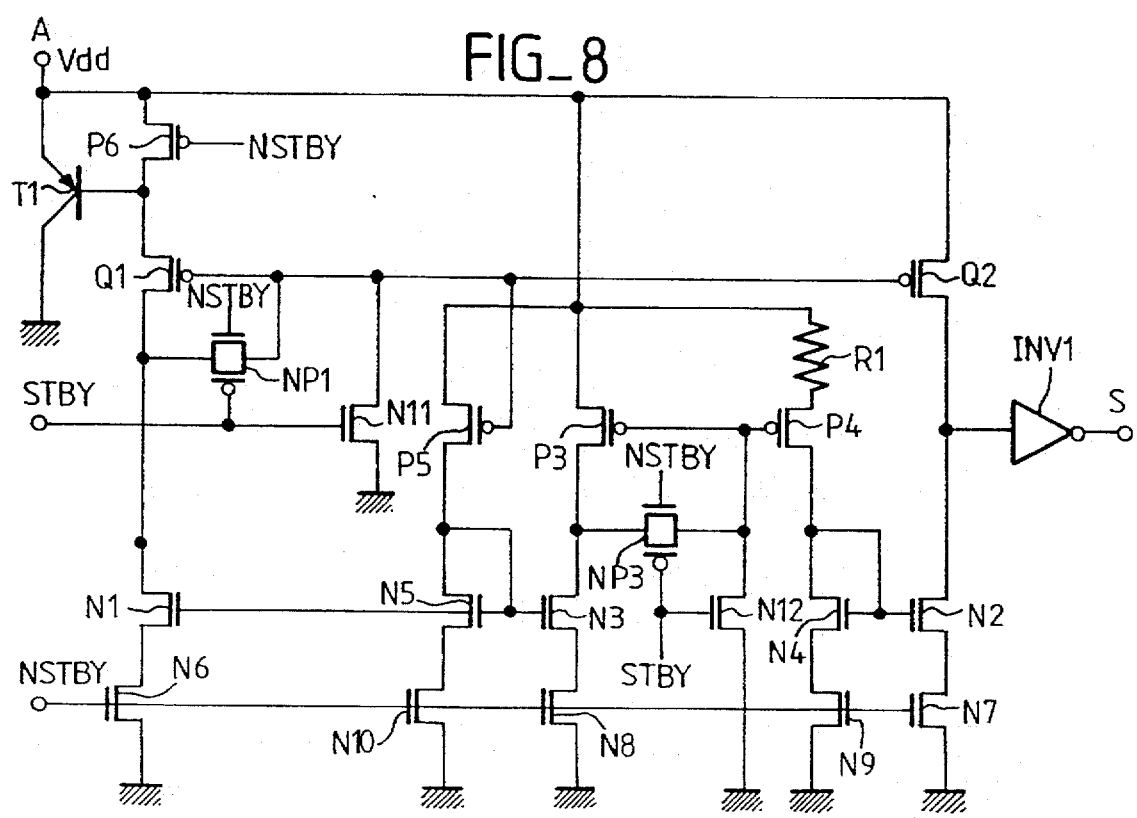
FIG_8

TEMPERATURE DETECTOR ON AN INTEGRATED CIRCUIT

BACKGROUND OF THE INVENTION

1. Field of the Invention

The invention relates to integrated circuits, and more particularly to a detector circuit means for the detection of the temperature of an integrated circuit, the detector circuit means forming part of the integrated circuit itself.

One application of the invention is protection against fraud in which the integrated circuit is deliberately heated up to a temperature where it can no longer work normally. Indeed, integrated circuits are designed to fulfil their functions within a specific range of temperatures. For temperatures outside this range, the operation becomes abnormal and a fraudulent use of this anomaly may be envisaged. There is therefore provision for a temperature detector that activates an appropriate protective action (generally an inhibition of operation of the integrated circuit) when the temperature goes out of the limits of the range for which the normal working of the circuit is ensured. In practice, it is above all towards the top of the temperature range that fraud-preventive measures have to be taken.

The invention can be used also for other applications in which the temperature of the integrated circuit needs to be checked. However, it will be described with respect to this particular application for which it has been designed.

In this application, one method of protection against fraud includes in testing the working of the integrated circuit up to a temperature (Tp2) that is higher than the maximum operating temperature permitted (Tp1). A temperature detector is positioned to activate protective action at a reference temperature Tpr ranging between these two temperatures Tp1 and Tp2. Typically, the range of normal operation goes up to Tp1=85° C. (for current applications). The test temperature may be Tp2=125° C. The temperature at which the detector Tpr is activated is between the two, for example 90° C.

2. Discussion of the Related Art

Temperature detectors already exist. They use a measurement of the leakage current of reverse-biased PN junctions: this leakage current shows high variation as the function of the temperature. However, these detectors implement reverse currents that are very low (of the order of some tens of picoamperes), and hence are difficult to measure. They are highly sensitive to noise and have very high time constants. This makes it difficult to test these devices. Testing of these detectors is indispensable if it is desired that they should fulfil their functions under the requisite conditions.

SUMMARY OF THE INVENTION

The invention proposes the use of a different type of detector. This detector uses two similar MOS transistors and a PN junction, and its operation relies on the comparison of the conduction of these two transistors, the second one having a gate-source voltage greater in terms of absolute value than that of the first one, the difference being the drop in voltage Vbe at the terminals of the forward-biased PN junction. Owing to the presence of this difference in gain-source voltages, the curves of the variation, with temperature, of the currents in the transistors are not identical. These curves, or curves deduced from these curves by homothetic transformation, intersect one another for a certain value of temperature. The detection of the intersection enables the detection of this value and hence the definition of a detectable temperature threshold.

The main reason for which the variation curves are not identical is the presence of the voltage drop Vbe in the gate-source circuit of the second transistor. This voltage drop indeed has the particular effect of falling with temperature. The gate-source voltage of this second transistor, which is higher than that of the first transistor, falls faster than that of this first transistor. The current in the second transistor falls more quickly than the current in the first transistor. If, at ambient temperature, the current in the second transistor is higher than in the first one (but nevertheless not excessively), the curves of variation of current with the temperature may intersect. The point of intersection depends on the relative dimensions of the transistors given that, for a given gate-source voltage, the current is proportional to the width/length (W/L) ratio of the transistor. By choosing the relative dimensions, it is therefore possible to define the temperature at which the currents are equal. If a current comparator is used, it is then possible to provide an activation signal when the temperature goes beyond the value for which the currents in the transistors are equal or, as shall be seen further below, the value for which the currents deduced by homothetic transformation from the currents in the transistors are equal.

The invention therefore proposes an integrated circuit with a temperature threshold detector, comprising two MOS transistors with the same type of conductivity, circuitry for applying to the second transistor a gate-source voltage higher than the gate-source voltage of the first transistor by a value Vbe, Vbe being the drop in voltage at the terminals of a forward-biased PN junction, and a comparator for comparing the currents flowing in the two transistors.

The comparator means preferably has a circuit to copy the current flowing in one of the transistors, this copying circuit being series-connected with the second transistor. The copying is done with a factor of proportionality factor that enables the adjusting of the switch-over temperature.

Preferably, one of the two MOS transistors has its gate-source voltages slightly higher than its threshold voltage, and this result is obtained by connecting the drain and the gate of this transistor together.

This detector can be made notably in CMOS technology, wherein certain MOS transistors are formed in wells with conductivity of a type opposite that of the substrate. It is then possible to use, as a PN junction, the base-emitter junction of a parasitic bipolar transistor formed by the substrate (constituting the collector of the bipolar transistor), a well with conductivity opposite that of the substrate (constituting the base of the transistor) and a diffusion with a type of conductivity opposite that of the well, formed in this well (constituting the emitter of the transistor).

In a practical embodiment of the detector according to the invention, the source of a first MOS transistor is series-connected with the PN junction, this PN junction being furthermore connected to a fixed potential; this first transistor has its gate connected to its drain; a second MOS transistor, of the same type as the first one, has its gate connected to the gate of the first transistor and its source directly connected to the same fixed potential. The output of the detector is taken at the drain of the second transistor. The drains of the two transistors are supplied by current sources so that a current flows in each of them, and a direct current flows in the PN junction. The assembly is such that the gate-source voltages of the two transistors are different, the difference being equal to the drop in direct voltage (Vbe) in the PN junction.

The current comparator may be formed by supplying current to the drain of the first transistor and the drain of the second transistor using of current sources providing current in a constant ratio with respect to each other. This ratio is defined by the relative geometries of the transistors constituting these current sources.

BRIEF DESCRIPTION OF THE DRAWINGS

Other features and advantages of the invention shall appear from the following detailed description, made with reference to the appended drawings, of which:

FIG. 1 shows a simple electrical diagram of a temperature detector according to the invention;

FIG. 2 shows a graph of currents that could flow in the two MOS transistors of FIG. 1;

FIG. 3 shows another graph of currents in the transistors of FIG. 1;

FIG. 4 and FIG. 5 show simple practical embodiments of the invention;

FIG. 6 shows a sectional view of an integrated circuit incorporating the detector of FIG. 1;

FIG. 7 shows the detector, modified so that it can work with a particularly low supply voltage; and FIG. 8 shows the detector of FIG. 7 modified to further include a standby mode of operation with reduced consumption.

DETAILED DESCRIPTION

The simple detector of FIG. 1 has two field-effect transistors Q1 and Q2 of the same nature, namely with the same type of conductivity. They may be NMOS or PMOS type transistors. In the example described, they are PMOS transistors. If they were NMOS transistors it would be necessary to reverse all the types of conductivity and the directions of potentials of the diagram to obtain a symmetrical diagram. Preferably, P channel transistors are used if the technology used is a CMOS technology on a P type substrate with N type wells for the P channel transistors.

The first transistor Q1 preferably has its drain connected to its gate G1. Its source S1 is connected to the base of a PNP bipolar transistor T1 whose emitter is connected to a supply terminal A, at a fixed positive potential Vdd (for example 3 volts or 5 volts). The collector of the transistor T1 is Preferably connected to the ground GND. However, this is not obligatory. It will be seen that, in practice, the collector-base junction of this transistor is the well-substrate junction in CMOS technology on a P type substrate with N type wells. The substrate then defines the ground potential. This explains why the collector of the transistor is represented with a connection to the ground.

The emitter-base junction of the transistor T1 is a forward-biased PN junction. The base current of this transistor T1 goes through the PMOS transistor Q1.

The drain of the transistor Q1 is connected to a constant current source SC1 that is furthermore grounded. This source fixes the current I1 which travels through the transistor Q1 and also travels through the base of the transistor T1.

The second PMOS transistor Q2 has its gate connected to the gate of Q1 and its source directly connected to the supply terminal A at Vdd.

It is known that the current that can go through a MOS transistor depends on several factors, namely:

the absolute value Vgs of the gate-source voltage;
the width/length ratio (W/L) of the transistor; and
the temperature.

Among the other physical characteristics that may come into play, there is a threshold voltage Vt of the transistor. It is assumed that it is the same for the two transistors Q1 and Q2. It can vary as a function of the temperature, but identically for both transistors.

The absolute value Vgs2 of the gate-source voltage of the transistor Q2 is always greater than the absolute value of Vgs1 of the gate-source voltage of the transistor Q1. The difference is indeed the absolute value Vbe of the drop in emitter-base voltage of the bipolar transistor T1.

Consequently, at a given temperature and for identical dimensions of transistors Q1 and Q2, the current in the transistor Q2 tends to be greater than the current in the transistor Q1.

The current in the transistor Q1 is fixed by the current source SC1. This current then determines the value of the voltage Vgs1 and that of the voltage Vbe for given dimensions of the transistors Q1 and T1.

The gate-source voltage Vgs2 of the second transistor Q2 is therefore also determined since, in terms of absolute value, it is the sum of the voltages Vgs1 and Vbe.

Since there is a gate-source voltage Vgs2 imposed, the transistor Q2 tends to conduct a current I2 that depends solely on its gate width-to-length ratio. The current truly present in the transistor Q2 may be equal to I2 if the bias of Q2 allows it. If, furthermore, there is a tendency to impose a different current in the transistor Q2, then the conflict resulting therefrom will make the potential of the drain of Q2 rise or fall. An explanation shall be given further below of how this enables the detection of a crossing of the temperature threshold.

If the temperature Tp increases, the current I1 may vary (in practice it diminishes). However, the transistor Q1, owing to its being mounted as a diode (with the gate connected to the drain) remains in a state where its gate-source voltage is slightly greater than its threshold voltage Vtp. The current I2 which tends to go through the transistor Q2 will vary in the same sense (in practice it also diminishes). However, the base-emitter voltage Vbe of T1 falls with the temperature. Consequently, the difference between the gate-source voltages of the two transistors will diminish. The current I2 will therefore get reduced in greater proportions than the current I1 and not in the same proportion as this current I1.

FIG. 2 shows the variation of the current I1 with the temperature and the greater variation of the current I2 with the temperature. Since the reductions are not proportional, the curves are not parallel. They may intersect for a given temperature Tpr above the ambient temperature Ta if the transistor Q2 has smaller relative dimensions than the transistor Q1.

The point of intersection depends on the ratio between the currents I1 and I2 at the ambient temperature. And this ratio depends on the relative dimensions of the transistors Q1 and Q2.

FIG. 2 shows a curve of variation of I1 and two curves of variation of I2, referenced I2 and I'2. The first curve I2 corresponds to a first ratio K between the dimensions of the transistors Q1 and Q2, with k=(W2/L2)/(W1/L1) where W2, L2 are the width and length of the second transistor and W1, L1 are the corresponding dimensions for the first transistor. The second curve I'2, shown in dashes, corresponds to a second ratio k' between the dimensions of the transistors Q1 and Q2.

It can clearly be seen that the point of intersection of the curves I1 and I2 depends on the ratio k. Consequently, k can be chosen so that the curves intersect for a desired temperature which is the critical temperature not to be exceeded.

To ascertain that this critical temperature has been reached, it is then necessary to detect the equality between the current I1 that flows through the transistor Q1 and the current I2 that tends to flow in the transistor Q2 owing to its gate-source voltage Vgs2, its dimensions and the temperature.

To this end, the simplest method is to use the assembly shown in FIG. 1: a second current source SC'1 connected to the source SC1 copies the current of the source SC1 and tends to bring about the flow of a current I'1 equal to I1. The copying is done regardless of the temperature, i.e. if I1 varies with the temperature, I'1 varies in the same way.

This current source is connected to the drain of the transistor Q2 and tends to make a current I'1=I1 flow in this transistor. Since, furthermore, the assembly trends to make a current I2 flow into the transistor Q2, there is no balance except at the critical temperature Tpr where I2=I'1.

If I2 is greater than I'1 (in practice for temperatures below Tpr), the transistor Q2 tends to become saturated: indeed, it conducts a current that is lower than the one that would normally be imposed on it by its gate-source voltage. The drain-source potential of Q2 tends to remain close to zero. The potential of the drain of Q2 therefore remains close to Vdd.

If, on the contrary, I2 tends to be lower than I'1, in practice when the critical temperature is exceeded, it is this current source SC'1 that will be disturbed, in being unable to conduct all the current that it should conduct. It will get saturated. The potential of the drain of Q2 will fall to very close to zero.

The potential of the drain of Q2 therefore is a binary representation of the fact that the critical temperature Tpr has been exceeded or not exceeded. The drain of Q2 is preferably connected to the input of an inverter INV1 which, at its output, gives a control signal representing the crossing or non-crossing of critical temperature. The output S of the inverter INV1 may be used, for example, as an inhibition command for the entire integrated circuit or for a part of it.

Referring to FIG. 3, it will be noted that it is possible to compare not the current I2 and a current I'1=I1 but the current I2 and a current I'1 that is proportional to I1, the ratio of proportionality I'1/I1, however, remaining preferably constant when the temperature varies.

Indeed, assuming that the relative dimensions of the transistors Q1 and Q2 impose current curves I2 and I1 such as those that can be seen in FIG. 3, it is possible to have a current source SC'1 giving a current I'1 proportional to I1, a variation of the coefficient of proportionality shifting the curve I'1 by homothetic transformation. The point of intersection of the curves I'1 and I2 may then be adjusted by an appropriate choice of this ratio.

The current sources SC1 and SC'1 will be made in principle using transistors, for example transistors mounted as current mirrors, and it is easy to adjust the ratio of proportionality by a choice of the relative dimensions of these transistors.

It will be understood therefore that it is possible to adjust the detected temperature threshold either by the choice of the relative dimensions of the transistors Q2 and Q1 or by the choice of the ratio of proportionality of the sources SC1 and SC'1, or again by a combination of these two possibilities.

FIG. 4 shows a simple example of an embodiment wherein the current sources SC1 and SC'1 are constructed using two N channel transistors N1 and N2 having their gates connected to a common voltage source Vref, their sources grounded, one of their drains connected to the drain of Q1 (transistor N1), and the other connected to the drain of Q2 (transistor N2).

In a simple embodiment shown in FIG. 5, the voltage Vref is taken simply at the drain of the transistor N1, i.e. this transistor is mounted as a diode with its gate connected to its drain.

The transistors N1 and N2 have either identical dimensions (in the possibility explained with reference to FIG. 2), or different dimensions (in the possibility explained with reference to FIG. 3). In the latter case, the ratio between the width/length geometries of N1 and N2 enable an adjustment of the temperature threshold detected by the circuit.

FIG. 6 shows a sectional view of an integrated circuit illustrating how it is possible to make the temperature detector in practice by using, as a PNP bipolar transistor T1, a parasitic transistor formed between the P type substrate (the collector), an N type well diffused in the substrate (the base) and a P+ region diffused in the well (the emitter). This P+ region is connected to the supply voltage Vdd. The substrate is connected to the ground. The technology is a CMOS technology on a P type substrate. If it were a CMOS technology on a N type substrate, it would be necessary to reverse all the types of conductivity and the directions of potentials in the electrical diagrams of the detector.

The transistor Q1 is formed in a second N type well. Its source is connected by a connection to an ohmic contact (N+ diffusion) connected to the well. This ohmic contact is furthermore connected to the base of the bipolar transistor T1 by a conductive connection and another ohmic contact (N+ diffusion) diffused in the first well. The drain of the transistor Q1 is connected by connections firstly to its gate and secondly to the current source SC1 and finally to the gate of the transistor Q2.

The transistor Q2 is formed in a third N type well. Its drain is connected by a connection to the supply terminal A at Vdd. Its source is connected to the current source SC'1 and to the inverter INV1. The third well is preferably connected to the voltage Vdd by an N+type ohmic contact.

Returning to the drawing of FIG. 5 (with the transistor N1 mounted as the diode), this circuit works well provided that the value of the supply voltage Vdd is sufficient for the arm T1, Q1, N1 to conduct a current, i.e. for it to be possible for the three transistors to made conductive. Now this is possible only if the voltage Vdd is equal at least to the sum of the threshold voltages Vtn (about 0.8 to 1 volt), Vtp (about 0.8 to 1 volt), and the drop in direct voltage Vbe of the emitter-base junction of the transistor T1 (about 0.6 volt). It is therefore necessary to have at least 2.4 supply volts.

However, in certain cases, it is desired to be able to work in a greater range of supply voltages. Typically, it is desired that the circuit should work for supply voltages ranging from 2 volts to 7 volts.

In this case, it is preferable to apply a gate-source voltage of about 1 volt to the transistor N1 by a means other than a simple diode mounting of this transistor.

For this purpose, a reference voltage source is provided. This reference voltage source is capable of holding a control voltage on the gate of the transistor N1 even when the supply voltage Vdd is equal to about 2 volts.

The diagram of FIG. 7 enables this goal to be met. The elements common with FIG. 4 have the same references.

The reference voltage Vref needed to control the gate of N1 and N2 is produced by a reference voltage source working at a low supply voltage Vdd, i.e. even for Vdd equal to 2 volts. The reference voltage Vref produced is obtained in practice at two distinct outputs Vref1 (to control the gate of the transistor N1) and Vref2 (to control the gate of the transistor N2). These two voltages are practically identical.

The reference voltage source herein has six transistors, arranged as follows:

a MOS transistor P3 has its source connected to Vdd, its gate connected to its drain and its drain connected to the drain of an N channel MOS transistor N3 whose source is grounded, a P channel MOS transistor P4 has its source connected to Vdd using of a resistor R1, its gate connected to the gate of P3 and its drain connected to the gate and to the drain of an N channel transistor N4. The source of the transistor N4 is grounded, an N channel transistor N5 has its gate connected to its drain and furthermore connected to the gate of N3 and it has its source grounded. The gate of N5 is furthermore connected to the gate of the transistor N1 and it is at this gate that the reference voltage Vref1 appears. Vref1 is approximately equal to the threshold voltage of the N channel transistor N5, that is about 1 volt, finally, a P channel transistor P5 is used to provide sufficient current to the transistor N5. Its drain is connected to the drain of N5, its source is connected to Vdd and its gate is connected to the gate of the transistors Q1 and Q2.

The voltage Vref2 is present at the drain and gate of the transistor N4, this drain and this gate being therefore connected to the gate of N2.

It will be understood that the schematic diagram of FIG. 7 is the same as that of FIG. 4, except that the separate reference voltages Vref1 and Vref2 are applied to the gates of N1 and N2. Furthermore, these reference voltages are set up by an assembly that works even when the supply voltage Vdd is very close to the sum of the absolute values of the threshold voltages of the N and P transistors.

Other types of reference voltage sources could be used for the same purpose.

Finally, this temperature detector continuously consumes power. It is desirable to eliminate this consumption as far as possible. It is therefore preferably planned that a control signal STBY will control the different current consumption arms to reduce this consumption when the circuit is in standby mode.

FIG. 8 shows a modification of the circuit of FIG. 7 wherein additional switch transistors are added to enable operation in standby mode with reduced consumption.

In practice, the signal STBY and its logic complement NSTBY are applied to the control gates of different transistors series-connected in the different arms of the of the circuit. In particular, provision may be made for transistors N6, N7, N8, N9, N10 respectively series-connected between the transistors N1, N2, N3, N4, N5 and the ground to interrupt the link between these transistors and the ground in standby mode and for a transistor P6 between the base of the transistor T1 and Vdd to place this base at Vdd in standby mode by turning off the emitter-base junction of T1. Switches are furthermore provided in the gate-drain links of the transistors Q1 and P3 to interrupt these links in standby mode. These switches NP1 and NP3 are preferably each formed by a P channel MOS transistor in parallel with an N channel transistor respectively controlled by the signals STBY and NSTBY. Finally, two N channel transistors N11 and N12, controlled by the signal STBY, enable the grounding, in standby mode, firstly of the gate of Q1 and secondly of the gate of P3 when these gates are disconnected from their respective drains.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An integrated circuit with temperature threshold detector, comprising two MOS transistors with a same type of conductivity, means for applying to the second transistor a gate-source voltage higher than the gate-source voltage of the first transistor by a value Vbe, Vbe being a drop in voltage at terminals of a forward-biased PN junction, and means for comparing currents flowing in the two transistors.

2. An integrated circuit according to claim 1, wherein the second transistor has a source that is connected directly to a supply terminal and the first transistor has a source that series-connected to this same terminal by means of the PN junction.

3. An integrated circuit according to claim 1, wherein the means for comparing comprises a means for copying the current flowing in one of the transistors, the means for copying being series-connected with the second transistor.

4. An integrated circuit according to claim 3, comprising a first current source series-connected with the first transistor to provide a determined current in the first transistor, and wherein the means for copying copies the current in the first source with a fixed proportionality factor.

5. An integrated circuit according to claim 4, wherein the second current source is series-connected with a drain of the second transistor.

6. An integrated circuit according to claim 5, wherein the second current source comprises an additional transistor of a type opposite that of the first and second transistors, the additional transistor having a drain connected to the drain of the second transistor and a source connected to ground, and wherein the output of the detector is taken at a junction point of the drains of the second transistor and of the additional transistor.

7. An integrated circuit according to claim 1, made in CMOS technology with wells having a type of conductivity opposite that of the substrate, wherein the PN junction is formed firstly by a well connected to a source of the first transistor and, secondly, by a surface diffusion that is formed in the well and is of a type opposite that of the well, this diffusion being connected to a supply terminal.

8. A method of protecting an integrated circuit against fraud perpetrated by raising the integrated circuit to a temperature at which abnormal operation occurs, comprising steps of:

applying a first gate-source voltage to a first MOS transistor, thereby causing first drain current to flow;

applying a second gate-source voltage lower than the first gate-source voltage by an amount equal to a voltage across a forward biased PN junction to a second MOS transistor, thereby causing a second drain current to flow;

comparing the currents flowing in the two transistors; and responsive to the step of comparing, inhibiting operation of the integrated circuit.

9. The method of protecting an integrated circuit against fraud of claim 8, further comprising a step of:

providing a determined current in the second transistor by means of a first current source series connected with the drain of the second transistor; and copying the determined current with a fixed proportionality factor in a second current source series connected with the drain of the first transistor;

the step of comparing including a step of measuring a voltage at the drain of the first MOS transistor.

10. A temperature threshold detector formed on an integrated circuit, comprising:

two MOS transistors with a same type of conductivity means for applying to the second transistor a gate-source voltage higher than the gate-source voltage of the first transistor by a value Vbe, Vbe being a drop in voltage at terminals of a forward-biased PN junction, and means for, comparing the currents in the two transistors, thereby determining whether the temperature is above or below a threshold temperature.

11. The temperature threshold detector of claim 10, further comprising:

a first current source to provide a determined current in the first transistor, and a second current source series connected with the drain of the second transistor, to copy the determined current of said first current source with a fixed proportionality factor, the second current to follow the first current whereby an output voltage at the drain of said second transistor indicates whether the threshold temperature is exceeded.

12. The temperature threshold detector of claim 11, wherein the forward-biased PN junction is an emitter-base junction of a junction transistor that includes a collector connected to a circuit reference voltage.

* * * * *